US012573075B2

(12) United States Patent
Olutomilayo

(10) Patent No.: US 12,573,075 B2
(45) Date of Patent: Mar. 10, 2026

(54) OBJECT POSE FROM SENSOR MOTION

(71) Applicant: Ford Global Technologies, LLC, Dearborn, MI (US)

(72) Inventor: Kunle Olutomilayo, Newark, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 349 days.

(21) Appl. No.: 18/295,370

(22) Filed: Apr. 4, 2023

(65) Prior Publication Data

US 2024/0338841 A1     Oct. 10, 2024

(51) Int. Cl.
*G06T 7/70* (2017.01)
*G06T 7/20* (2017.01)

(52) U.S. Cl.
CPC . *G06T 7/70* (2017.01); *G06T 7/20* (2013.01)

(58) Field of Classification Search
CPC .................................... G06T 7/70; G06T 7/20
See application file for complete search history.

(56) References Cited

U.S. PATENT DOCUMENTS

| | | |
|---|---|---|
| 8,311,730 B2 | 11/2012 | Neff |
| 8,467,596 B2 | 6/2013 | Abadpour et al. |
| 8,923,638 B2 | 12/2014 | Jin |
| 9,083,945 B2 | 7/2015 | Jin |
| 9,148,650 B2 | 9/2015 | Chandraker |
| 9,292,937 B2 | 3/2016 | Jin |
| 10,198,858 B2 | 2/2019 | Singh et al. |

| | | | |
|---|---|---|---|
| 10,481,277 B2 | 11/2019 | Schmid | |
| 10,630,962 B2 * | 4/2020 | Dabeer | H04N 7/181 |
| 10,706,582 B2 | 7/2020 | Chandraker et al. | |
| 10,867,409 B2 * | 12/2020 | Jin | G06T 7/80 |
| 10,885,659 B2 | 1/2021 | Li et al. | |
| 11,145,080 B2 | 10/2021 | Chen et al. | |
| 2018/0001766 A1 | 1/2018 | McNew | |
| 2019/0033867 A1 * | 1/2019 | Sharma | G06T 7/73 |

(Continued)

FOREIGN PATENT DOCUMENTS

| | | |
|---|---|---|
| CN | 110910451 A | 3/2020 |
| CN | 110930452 A | 3/2020 |

(Continued)

OTHER PUBLICATIONS

Scaramuzza, D., et al., "Absolute Scale in Structure from Motion from a Single Vehicle Mounted Camera by Exploiting Nonholonomic Constraints," IEEE 12th International Conference on Computer Vision, 2009, 3 pages.

(Continued)

*Primary Examiner* — Stephen R Koziol
(74) *Attorney, Agent, or Firm* — Frank A. MacKenzie; Brooks Kushman P.C.

(57)     ABSTRACT

A computer includes a processor and a memory, and the memory stores instructions executable to receive sensor data from a sensor indicating an object at a plurality of time steps, receive motion data indicating motion of the sensor at the time steps, determine a plurality of virtual pixel locations of the sensor at the time steps from a perspective of a virtual camera located at the object based on the sensor data and on the motion data, and determine a pose of the object using the virtual pixel locations. The sensor moves while generating the sensor data, and the object is stationary.

20 Claims, 5 Drawing Sheets

(56)                    References Cited

U.S. PATENT DOCUMENTS

| | | |
|---|---|---|
| 2020/0363815 A1 | 11/2020 | Mousavian et al. |
| 2022/0084241 A1 | 3/2022 | Dikhale et al. |
| 2022/0187841 A1* | 6/2022 | Ebrahimi Afrouzi ........................ G05D 1/0274 |
| 2023/0243970 A1* | 8/2023 | Lee ......................... G01S 17/66 356/4.01 |

FOREIGN PATENT DOCUMENTS

| | | |
|---|---|---|
| CN | 111161348 A | 5/2020 |
| CN | 111768447 A | 10/2020 |
| CN | 112446919 A | 3/2021 |
| CN | 112598735 A | 4/2021 |
| CN | 110097598 B | 9/2021 |
| CN | 113450408 A | 9/2021 |
| CN | 113780240 A | 12/2021 |
| CN | 114022553 A | 2/2022 |
| TW | 202032437 A | 9/2020 |

OTHER PUBLICATIONS

Schonberger, J., et al., "Structure-from-Motion Revisited," Computer Vision Foundation, 2016, 6 pages.
Choi, K., et al., "In-Lane Localization and Ego-Lane Identification Method Based on Highway Lane Endpoints," Hindawi Journal of Advanced Transportation, Feb. 2020, 16 pages.

* cited by examiner

OBJECT POSE FROM SENSOR MOTION

BACKGROUND

Modern vehicles typically include a variety of sensors. The sensors often include sensors that detect the external world, e.g., objects and/or characteristics of surroundings of the vehicle, such as other vehicles, road lane markings, traffic lights and/or signs, pedestrians, etc. Examples of such sensors include radar sensors, ultrasonic sensors, scanning laser range finders, light detection and ranging (lidar) devices, and image processing sensors such as cameras.

DETAILED DESCRIPTION

Figure 1:
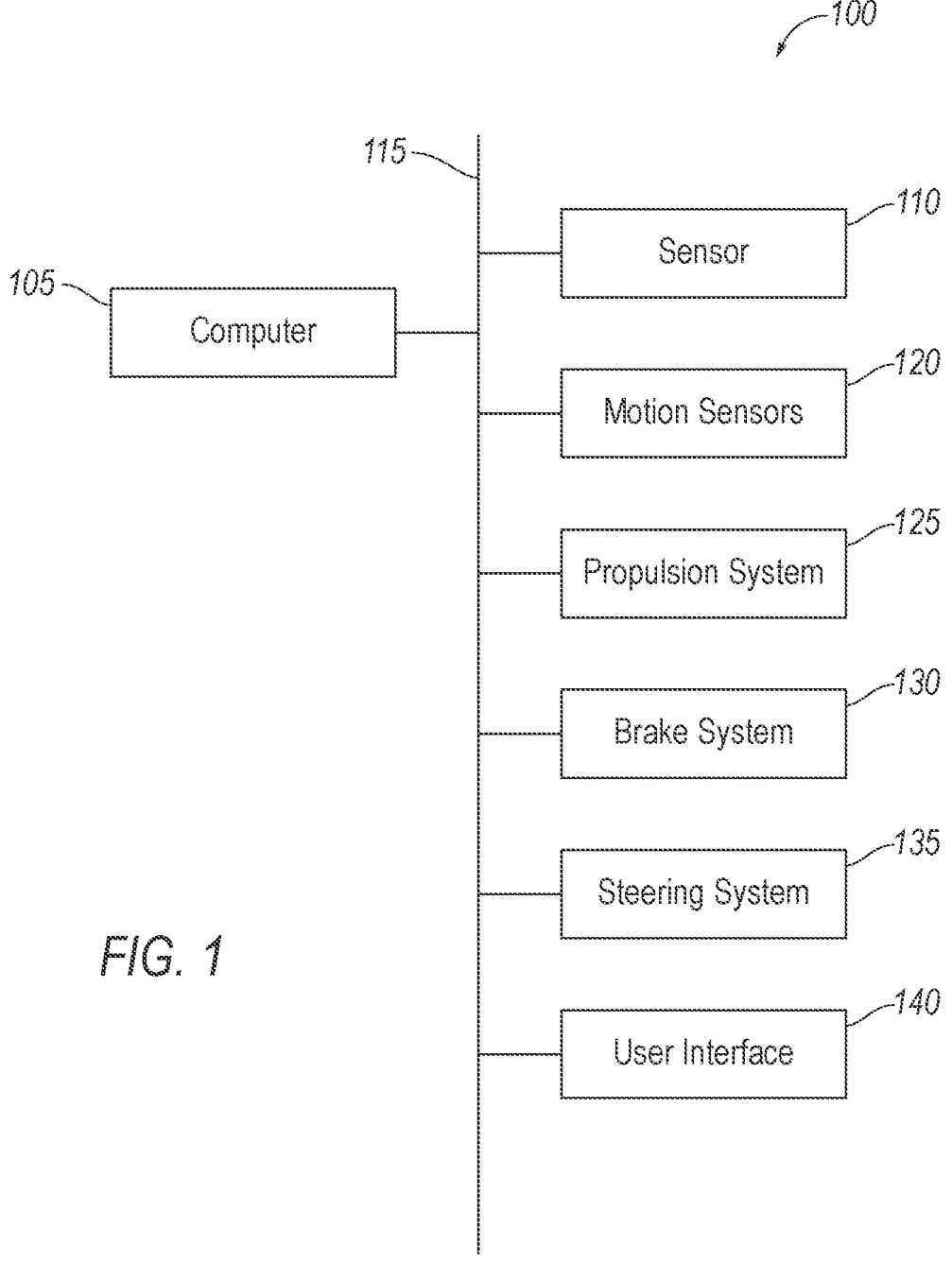
FIG. 1 is a block diagram of an example vehicle with a sensor.

This disclosure describes techniques for determining and tracking a pose of a stationary object using a moving sensor. The "pose" of an object includes the position and the orientation of the object. A computer receives sensor data from the sensor indicating the object at a plurality of time steps, receives motion data indicating motion of the sensor at the time steps, determines a plurality of virtual pixel locations of the sensor at the time steps from a perspective of a virtual camera located at the object based on the sensor data and on the motion data, and determines the pose of the object using the virtual pixel locations. The sensor may be mounted to a vehicle, and the motion data may be available from motion sensors of the vehicle. By taking advantage of the known motion of the sensor (e.g., of the vehicle), the computer is able to determine the pose of the object with minimal data about the object. The computer can use data from a single sensor, e.g., a single camera. The computer can perform the steps by tracking a single point on the object, meaning that the computer does not need data about features or geometry of the object. Despite the minimal inputs used, the resulting pose can have six degrees of freedom, three spatial dimensions and three rotational dimensions. The computer may use the pose of the object for actuating the vehicle, e.g., using one or more advanced driver assistance systems (ADAS).

A computer includes a processor and a memory, and the memory stores instructions executable to receive sensor data from a sensor indicating an object at a plurality of time steps, receive motion data indicating motion of the sensor at the time steps, determine a plurality of virtual pixel locations of the sensor at the time steps from a perspective of a virtual camera located at the object based on the sensor data and on the motion data, and determine a pose of the object using the virtual pixel locations. The sensor moves while generating the sensor data, and the object is stationary.

In an example, the instructions may further include instructions to actuate a component based on the pose of the object. In a further example, the component may be a component of a vehicle, the vehicle including the sensor.

In an example, the instructions to determine the pose of the object may include instructions to solve a camera pose estimation algorithm for a pose of the virtual camera. In a further example, the camera pose estimation algorithm may be a perspective-n-point algorithm.

In another further example, the motion data may include a plurality of rotations of the sensor between consecutive ones of the time steps, and the instructions to determine the pose of the object may include instructions to determine the pose of the object based on the pose of the virtual camera and on the rotations.

In an example, the instructions may further include instructions to determine a plurality of virtual positions of the sensor at the time steps from the perspective of the virtual camera, and the instructions to determine the pose may include instructions to determine the pose using the virtual positions. In a further example, the instructions to determine the virtual positions may include instructions to determine the virtual positions based on the motion data. In a yet further example, the motion data may include a plurality of actual positions of the sensor at the time steps and a plurality of rotations of the sensor between consecutive ones of the time steps, and the instructions to determine the virtual positions may include instructions to determine the virtual positions based on the actual positions and the rotations. In a still yet further example, the virtual positions may be products of respective cumulative rotations and the respective actual positions, and each cumulative rotation may be a product of the rotations from a first one of the time steps to a respective one of the time steps.

In an example, the sensor data may include a plurality of actual pixel locations of the object at the time steps, and the instructions to determine the virtual pixel locations may include instructions to determine the virtual pixel locations based on the actual pixel locations. In a further example, the motion data may include a plurality of rotations of the sensor between consecutive ones of the time steps, and the instructions to determine the virtual pixel locations may include instructions to determine the virtual pixel locations based on the rotations. In a yet further example, the virtual pixel locations may be products of respective cumulative rotations and the respective actual pixel locations, and each cumulative rotation may be a product of the rotations from a first one of the time steps to a respective one of the time steps. In a still yet further example, the virtual pixel locations may be products of an intrinsic matrix of the sensor, the respective cumulative rotations, an inverse of the intrinsic matrix, and the respective actual pixel locations.

In another further example, the instructions may further include instructions to apply an undistortion operation on the actual pixel locations, and the instructions to determine the virtual pixel locations may include instructions to apply a distortion operation to a result of the undistortion operation on the actual pixel locations.

In an example, the instructions to determine the virtual pixel locations may include instructions to determine the virtual pixel locations based on an intrinsic matrix of the sensor.

In an example, the instructions may further include instructions to determine that the object is stationary.

In an example, the pose of the object may have three spatial dimensions and three rotational dimensions.

In an example, the sensor may be a camera.

A method includes receiving sensor data from a sensor indicating an object at a plurality of time steps, receiving motion data indicating motion of the sensor at the time steps, determining a plurality of virtual pixel locations of the sensor at the time steps from a perspective of a virtual camera located at the object based on the sensor data and on the motion data, and determining a pose of the object using the virtual pixel locations. The sensor moves while generating the sensor data, and the object is stationary.

With reference to the Figures, wherein like numerals indicate like parts throughout the several views, a computer 105 of a vehicle 100 includes a processor and a memory, and the memory stores instructions executable to receive sensor data from a sensor 110 of the vehicle 100 indicating an object 200 at a plurality of time steps, receive motion data indicating motion of the sensor 110 at the time steps, determine a plurality of virtual pixel locations 455 of the sensor 110 at the time steps from a perspective of a virtual camera located at the object 200 based on the sensor data and on the motion data, and determine a pose of the object 200 using the virtual pixel locations 455. The sensor 110 moves while generating the sensor data, and the object 200 is stationary.

With reference to FIG. 1, the vehicle 100 may be any passenger or commercial automobile such as a car, a truck, a sport utility vehicle, a crossover, a van, a minivan, a taxi, a bus, etc. Alternatively, the vehicle 100 may be a flying vehicle such as an airplane, jet, drone, unmanned aerial vehicle (UAV), etc., or the vehicle 100 may be a watercraft such as a boat, submarine, unmanned underwater vehicle (UUV), unmanned surface vehicle (USV), etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided premanufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 115 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the sensor 110, motion sensors 120, a propulsion system 125, a brake system 130, a steering system 135, a user interface 140, and other components via the communications network 115.

The sensor 110 detects the external world, e.g., objects and/or characteristics of surroundings of the vehicle 100, such as other vehicles, road lane markings, traffic lights and/or signs, pedestrians, etc. The sensor 110 is therefore an environmental sensor. For example, the sensor 110 may be a radar sensor, an ultrasonic sensor, a scanning laser range finder, a light detection and ranging (lidar) device, or an image processing sensor such as a camera. As a camera, the sensor 110 can detect electromagnetic radiation in some range of wavelengths. For example, the sensor 110 may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type. The techniques described below are usable when the sensor 110 is a camera and can determine the pose of the object 200 even though the camera does not return depth data. The sensor 110 may be fixed to a body of the vehicle 100, e.g., rigidly mounted to the body of the vehicle 100.

The motion sensors 120 may detect the position and/or orientation of the vehicle 100. For example, the motion sensors 120 may include global navigation satellite system (GNSS) sensors such as global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The GPS sensor receives data from GPS satellites. The Global Positioning System (GPS) is a global navigation satellite system. The satellites broadcast time and geolocation data. The GPS sensor can determine a position of the vehicle 100, i.e., latitude and longitude, based on receiving the time and geolocation data from multiple satellites simultaneously.

The propulsion system 125 of the vehicle 100 generates energy and translates the energy into motion of the vehicle 100. The propulsion system 125 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 125 can include an electronic control unit (ECU) or the like that is in communication with and receives input from the computer 105 and/or a human operator. The human operator may control the propulsion system 125 via, e.g., an accelerator pedal and/or a gear-shift lever.

The brake system 130 is typically a conventional vehicle braking subsystem and resists the motion of the vehicle 100 to thereby slow and/or stop the vehicle 100. The brake system 130 may include friction brakes such as disc brakes, drum brakes, band brakes, etc.; regenerative brakes; any other suitable type of brakes; or a combination. The brake system 130 can include an electronic control unit (ECU) or the like that is in communication with and receives input from the computer 105 and/or a human operator. The human operator may control the brake system 130 via, e.g., a brake pedal.

The steering system 135 is typically a conventional vehicle steering subsystem and controls the turning of the wheels. The steering system 135 may be a rack-and-pinion system with electric power-assisted steering, a steer-by-wire system, as both are known, or any other suitable system. The steering system 135 can include an electronic control unit (ECU) or the like that is in communication with and receives input from the computer 105 and/or a human operator. The human operator may control the steering system 135 via, e.g., a steering wheel.

The user interface 140 presents information to and receives information from an occupant of the vehicle 100. The user interface 140 may be located, e.g., on an instrument panel in a passenger cabin of the vehicle 100, or wherever may be readily seen by the occupant. The user interface 140 may include dials, digital readouts, screens, speakers, and so on for providing information to the occupant, e.g., human-machine interface (HMI) elements such as are known. The user interface 140 may include buttons, knobs, keypads, microphone, and so on for receiving information from the occupant.

Figure 2:
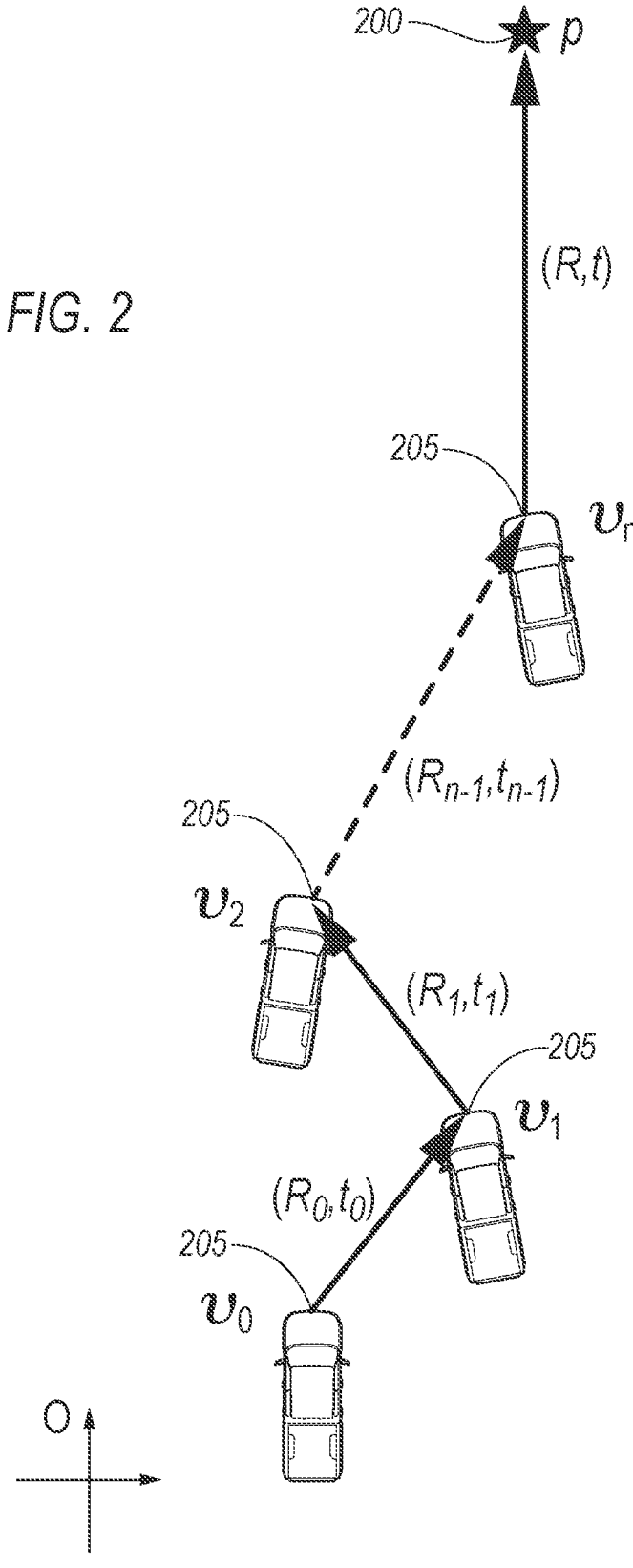
FIG. 2 is a diagram of example movement of the vehicle relative to an object.

With reference to FIG. 2, the vehicle 100 is moving through an environment while the computer 105 receives the sensor data from the sensor 110 indicating the object 200. Because the sensor 110 is fixed to the vehicle 100, the sensor 110 correspondingly moves through the environment while the computer 105 receives the sensor data from the sensor 110. The sensor 110 occupies a plurality of poses at a respective plurality of time steps. The poses include positions and orientations. The time steps are indicated with an index i, which is an element of $\{0, 1, 2, \ldots n\}$. FIG. 2 depicts movement with solid arrows between poses at consecutive time steps and a dashed arrow between the time steps i=2 and i=n to indicate an arbitrary number of intermediate poses.

The computer 105 is programmed to receive motion data indicating motion of the sensor 110 at the time steps from the motion sensors 120. The motion data may describe the motion of the vehicle 100, and the computer 105 may convert the motion data to indicate the motion of the sensor 110 using a known, fixed geometric relationship between the sensor 110 and the vehicle 100.

The motion data includes a plurality of actual positions $v_i$ 205 of the sensor 110 at the time steps i, a plurality of translations $t_i$ between consecutive ones of the time steps i, and a plurality of rotations $R_i$ of the sensor 110 between consecutive ones of the time steps i. The actual positions $v_i$ 205 are three-dimensional vectors providing coordinates in an absolute reference frame O. The translations $t_i$ are three-dimensional vectors indicating a change in position between time step i and time step i+1 relative to a reference frame of the sensor 110 at time step i. The rotations $R_i$ are 3×3 matrixes indicating a change in orientation between time step i and time step i+1 relative to a reference frame of the sensor 110 at time step i. The transformation of the pose of the sensor 110 between consecutive time steps i−1 and i is given by the following equation:

$$v_i = R_{i-1}v_{i-1} + t_{i-1}$$

The steps below use a cumulative rotation $\hat{R}_i$ of the sensor 110, which is a collective rotation of the sensor 110 through the time steps up to a current time step i. The computer 105 is programmed to determine the cumulative rotation $\hat{R}_i$ of the sensor 110. Each cumulative rotation $\hat{R}_i$ is a product of the rotations from a first one of the time steps i=0 to a respective one of the time steps i, as given in the following definitional equation. The product is a matrix product of 3×3 matrixes in the order of the time steps i, resulting in a 3×3 matrix.

$$\hat{R}_i = R_0 R_1 \ldots R_i$$

Described below are steps for determining the pose of the object 200. The pose of the object 200 may be given relative to the pose $v_n$ of the vehicle 100 at the final time step i=n. For example, the pose of the object 200 may be described as a transformation from the final actual position $v_n$ 205 of the vehicle 100 at the final time step i=n to the actual position p of the object 200, as given in the following equation. The transformation includes a translation t and a rotation R.

$$p = Rv_n + t$$

Figure 3:
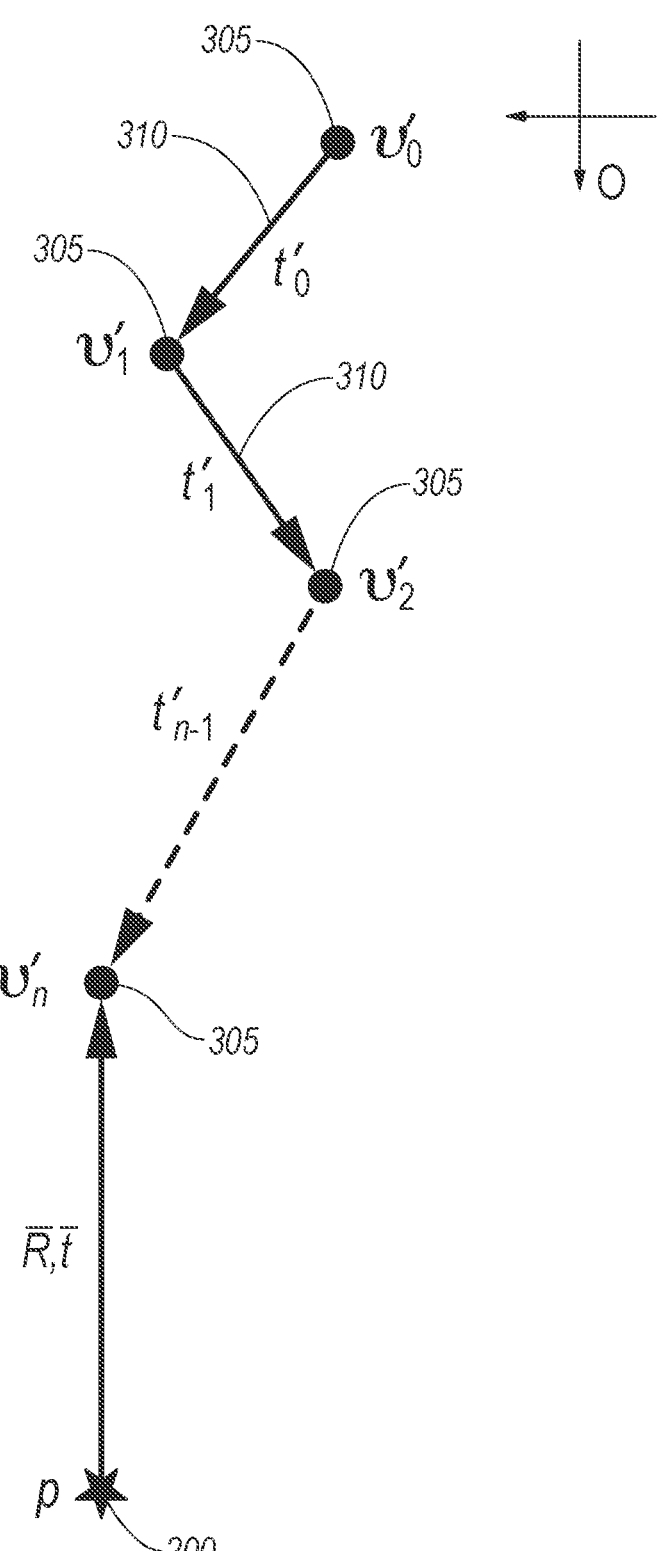
FIG. 3 is a diagram of the movement of the vehicle from a perspective of a virtual camera at the object.

FIG. 3 shows the actual positions $v_i$ 205 of the sensor 110 recast as virtual positions $v_i'$ 305 from the perspective of a virtual camera located at the object 200. As will be described below, this permits the determination of the pose of the object 200 by determining the pose of the virtual camera.

The computer 105 is programmed to determine the virtual positions $v_i'$ 305 of the sensor 110 at the time steps i from the perspective of the virtual camera. The computer 105 determines the virtual positions $v_i'$ 305 of the sensor 110 based on the motion data, e.g., based on the actual positions $v_i$ 205 and the rotations $R_i$. For example, the virtual positions $v_i'$ 305 may be products of the respective cumulative rotations $\hat{R}_{i-1}$ and the respective actual positions $v_i$ 205, as given in the following equation:

$$v_i' = \hat{R}_{i-1}v_i$$

The computer 105 may represent or track the virtual positions $v_i'$ 305 of the sensor 110 at the time steps i using virtual translations $t_i'$ 310. The computer 105 determines the virtual translations $t_i'$ 310 of the sensor 110 based on the motion data, e.g., based on the actual translation $t_i$ 205 and the rotations $R_i$. For example, the virtual translations $t_i'$ 310 may be products of the respective cumulative rotations $\hat{R}_i$ and the respective actual translations $t_i$ 205, as given in the following equation:

$$t_i' = \hat{R}_i t_i$$

such that the virtual positions $v_i'$ 305 in FIG. 3 are related or represented by virtual translations $t_i'$ 310 only.

Figure 4:
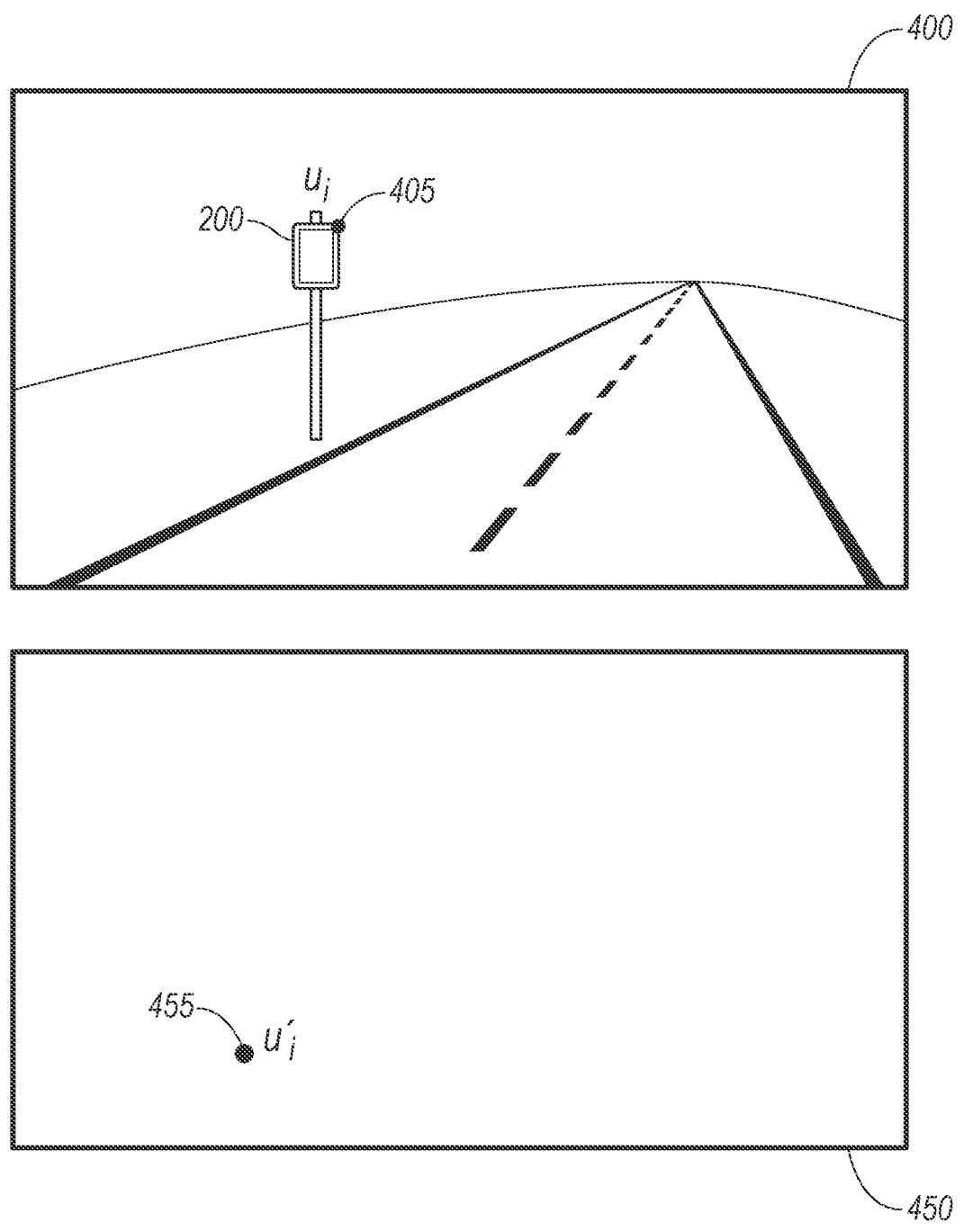
FIG. 4 is a diagram of image frames from the sensor and the virtual camera.

With reference to FIG. 4, the computer 105 is programmed to receive the sensor data from the sensor 110 indicating the object 200 at the time steps i. The sensor 110 may be moving while generating the sensor data, e.g., resulting from movement of the vehicle 100. The sensor data are a sequence of image frames 400 of the field of view of the sensor 110. Each image frame 400 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Location in an image frame 400 can be specified in pixel dimensions or coordinates, e.g., an ordered pair of pixel distances, such as a number of pixels from a top edge and a number of pixels from a left edge of the image frame 400.

The object 200 is stationary. The computer 105 may be programmed to determine that the object 200 is stationary. For example, the computer 105 can identify the object 200 using conventional image-recognition techniques, e.g., a convolutional neural network programmed to accept images as input and output an identified object, as a type of object that is classified as stationary. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, and the final output is the type with the highest score. The memory of the computer 105 may store classifications of the types as stationary or nonstationary, e.g., road signs as stationary and bicycles as nonstationary, e.g., as a lookup table.

The sensor data includes a plurality of actual pixel locations $u_i$ 405 of the object 200 at the time steps i. The techniques below may use the actual pixel locations $u_i$ 405 of a single point on the object 200. Thus, each image frame 400 may include one actual pixel location $u_i$ 405 of the object 200. The single point may be a prespecified point on the object 200 that is the same from time step to time step. For example, if the object 200 is a road sign as depicted in FIG. 4, the point may be a top right corner of the road sign. The actual pixel location $u_i$ 405 may be a pixel location of the single point on the object 200, e.g., a two-dimensional vector representing pixel coordinates.

The computer 105 may be programmed to determine the actual pixel locations $u_i$ 405 at the respective time steps. The computer 105 may determine the actual pixel location $u_i$ 405, e.g., initially, using the same object-recognition algorithms as described above. The computer 105 may determine the actual pixel location $u_i$ 405, e.g., after initial identification of the object 200, using any suitable video-tracking algorithm, e.g., target representation and localization algorithms such as kernel-based tracking or contour tracking, filtering and data association algorithms such as a Kalman filter or particle filter, etc.

The computer 105 is programmed to determine a plurality of virtual pixel locations $u_i'$ 455 of the sensor 110 at the time steps i from the perspective of the virtual camera located at the object 200. The virtual pixel location $u_i'$ 455 is a pixel location of the sensor 110 as would be seen in a virtual image frame 450 that would be generated by the virtual camera. In other words, if the virtual camera located at the object 200 were real and produced a real image frame, then the sensor 110 would be located in that image frame at the virtual pixel location $u_i'$ 455. Because the virtual camera does not actually exist, the virtual image frame 450 is depicted in the Figures as blank.

The computer 105 is programmed to determine the virtual pixel locations $u_i'$ 455 of the sensor 110 at the time steps i from the perspective of the virtual camera based on the sensor data and on the motion data. The computer 105 determines the virtual pixel locations $u_i'$ 455 based in part on the actual pixel locations $u_i$ 405 from the sensor data. The computer 105 also determines the virtual pixel locations $u_i'$ 455 based in part on the rotations $R_i$ from the motion data. The computer 105 may also determine the virtual pixel locations $u_i'$ 455 based in part on an intrinsic matrix K of the sensor 110. The intrinsic matrix K of the sensor 110 is known from calibration of the sensor 110 and may be provided by a manufacturer of the sensor 110. The virtual pixel locations $u_i'$ 455 may be a product of the respective cumulative rotations $\hat{R}_{i-1}$ and the respective actual pixel locations $u_i$ 405, more specifically a product of the intrinsic matrix K, respective cumulative rotations $\hat{R}_{i-1}$, an inverse of the intrinsic matrix $K^{-1}$, and the respective actual pixel locations $u_i$ 405, as given in the following equation:

$$u_i' = K\hat{R}_{i-1}K^{-1}u_i$$

The computer 105 may further account for distortion in the sensor data by the sensor 110. The computer 105 may determine the virtual pixel locations $u_i'$ 455 as described above, and additionally apply an undistortion operation $\overline{D}$ on the actual pixel locations $u_i$ 405 and apply a distortion operation D to a result of the undistortion operation $\overline{D}$ on the actual pixel locations $u_i$ 405 as used in the product described immediately above, as given in the following equation:

$$u_i' = D\left(K\hat{R}_{i-1}K^{-1}\overline{D}(u_i)\right)$$

Returning to FIG. 3, the computer 105 may be programmed to solve a camera pose estimation algorithm for a pose of the virtual camera. The camera pose estimation algorithm is any suitable algorithm that takes a plurality of points in space and a plurality of pixel locations of those points viewed by a camera and returns a pose of the camera. For example, the camera pose estimation algorithm may be a perspective-n-point algorithm, as is known. Unconventionally, the camera pose estimation algorithm is not used to determine a pose of an actual camera, but instead of the virtual camera, from which the pose of the noncamera object 200 may be determined as described below. The computer 105 may execute the camera pose estimation algorithm with an outlier detection algorithm applied to the points and/or to the pixel locations. An example of an outlier detection algorithm is random sample consensus (RANSAC).

The inputs to the camera pose estimation algorithm are the virtual positions $v_i'$ 305 and the virtual pixel locations $u_i'$ 455. The virtual positions $v_i'$ 305 may be provided as a 3×n matrix with one virtual position $v_i'$ 305 in each column, with an origin shifted to the final virtual position $v_n'$ 305, as given in the following equation:

$$P = [\, v_0'\ \ v_1'\ \ \dots\ \ v_n'\,] - v_n'\mathbf{1}^T$$

in which 1 is a column vector of ones and in which the superscript T represents the transpose operation. The second term shifts the origin to the final virtual position $v_n'$ 305. The virtual pixel locations $u_i'$ 455 may be provided as a matrix with 2×n matrix with one virtual pixel location $u_i'$ 455 in each column, as given in the following equation:

$$U = [\, u_0'\ \ u_1'\ \ \dots\ \ u_n'\,]$$

The output of the camera pose estimation algorithm is the pose of the virtual camera for which the points P would appear at the pixel locations U of the virtual image frame 450 from the virtual camera. The pose of the virtual camera may be represented as a transformation from the virtual camera to the final virtual position $v_n'$ 305. The transformation may include a translation $\bar{t}$ and a rotation $\bar{R}$.

The computer 105 is programmed to determine a pose of the object 200 using the virtual pixel locations $u_i'$ 455 and the virtual positions $v_i'$ 305. Specifically, the computer 105 determines the pose of the object 200 based on the pose of the virtual camera, which is determined from the virtual pixel locations $u_i'$ 455 and the virtual positions $v_i'$ 305, as described. The computer 105 may determine the pose of the object 200 based on the pose of the virtual camera and on the rotations $R_i$ from the motion data. As noted above, the pose of the object 200 may be described as a transformation from the final actual position $v_n$ 205 of the vehicle 100 at the final time step i=n to the actual position p of the object 200, the transformation including a translation t and a rotation R. The rotation R of the pose of the object 200 is the product of the rotation of the virtual camera $\bar{R}$ and the cumulative rotation of the final actual position $\hat{R}_{n-1}$, as given in the following equation:

$$R = \bar{R}^T \hat{R}_{n-1}$$

The translation t of the pose of the object 200 is the negative of the product of the transpose of the rotation of the virtual camera $\bar{R}$ and the translation of the virtual camera $\bar{t}$, as given in the following equation:

$$t = -\bar{R}^T \bar{t}$$

The pose of the object 200 has three spatial dimensions and three rotational dimensions.

Figure 5:
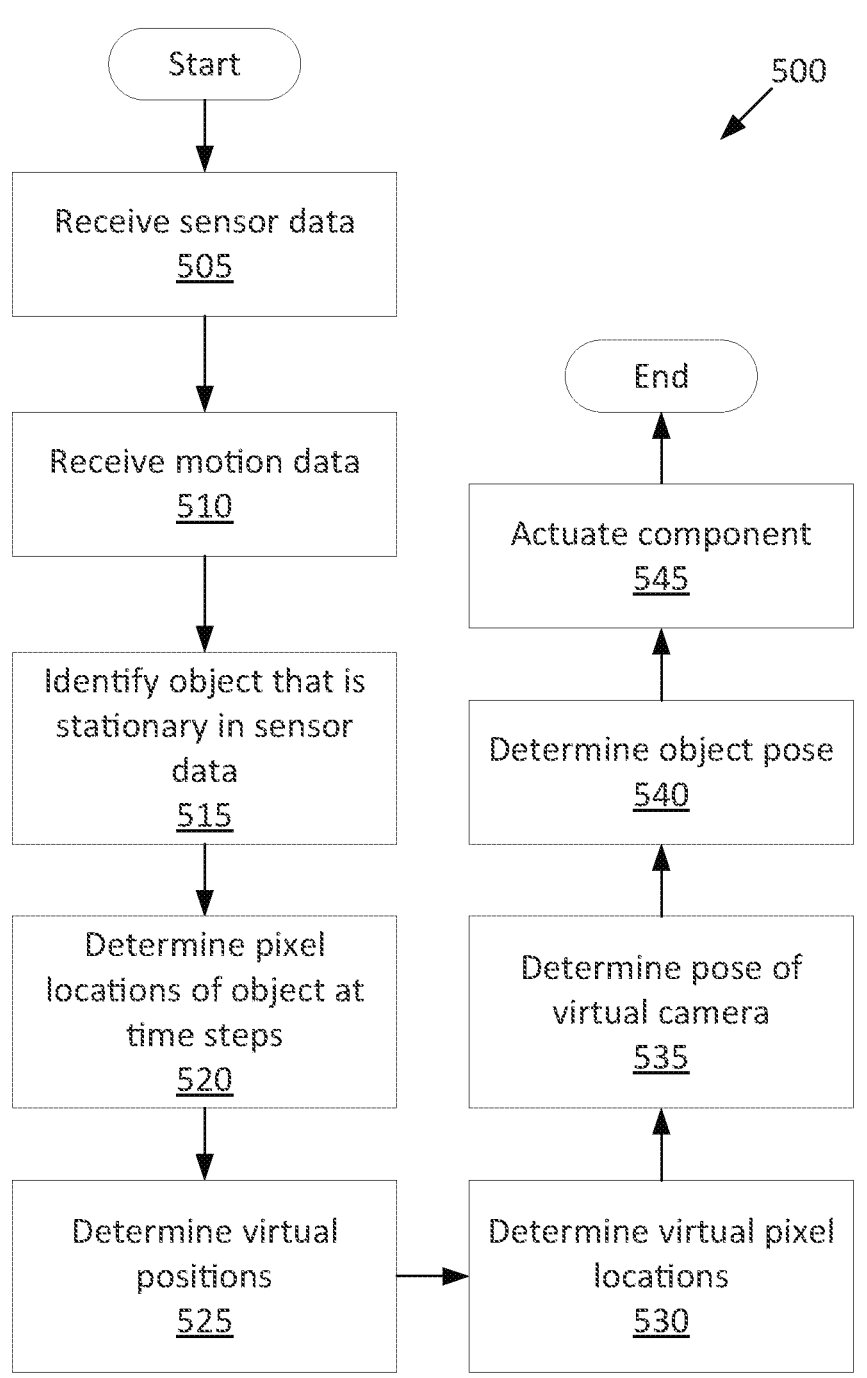
FIG. 5 is a flowchart of an example process for determining a pose of the object.

FIG. 5 is a process flow diagram illustrating an example process 500 for determining the pose of the object 200. The memory of the computer 105 stores executable instructions for performing the steps of the process 500 and/or programming can be implemented in structures such as mentioned above. As a general overview of the process 500, the computer 105 receives sensor data from the sensor 110 and motion data from the motion sensors 120, identifies the object 200, determines the actual pixel locations $u_i$ 405 at the time steps i, determines the virtual positions $v_i'$ 305, determines the virtual pixel locations $u_i'$ 455, determines the pose of the virtual camera, determines the pose of the object 200, and actuates a component based on the pose of the object 200.

The process 500 begins in a block 505, in which the computer 105 receives the sensor data from the sensor 110, as described above.

Next, in a block 510, the computer 105 receives the motion data from the motion sensors 120, as described above.

Next, in a block 515, the computer 105 identifies the object 200, as described above.

Next, in a block 520, the computer 105 determines the actual pixel locations $u_i$ 405, as described above.

Next, in a block 525, the computer 105 determines the virtual positions $v_i'$ 305, as described above.

Next, in a block 530, the computer 105 determines the virtual pixel locations $ut_i'$ 455, as described above.

Next, in a block 535, the computer 105 determines the pose [$\bar{R}$|$\bar{t}$] of the virtual camera, as described above.

Next, in a block 540, the computer 105 determines the pose [R|t] of the object 200, as described above.

Next, in a block 545, the computer 105 actuates at least one component based on the pose [R|t] of the object 200. The at least one component may include at least one component of the vehicle 100, e.g., the propulsion system 125, the brake system 130, the steering system 135, and/or the user interface 140. For example, the computer 105 may actuate the component in executing an advanced driver assistance system (ADAS). ADAS are groups of electronic technologies that assist drivers in driving and parking functions. Examples of ADAS include forward collision warning, lane-departure warning, blind-spot warning, automatic emergency braking, adaptive cruise control, and lane-keeping assistance. The computer 105 may actuate the brake system 130 based on the pose of the object 200 to avoid the object 200 while executing automatic emergency braking. The computer 105 may actuate the user interface 140 based on the pose of the object 200 to output a message to the operator indicating the presence of the object 200 while executing forward collision warning or blind-spot warning. For another example, the computer 105 may operate the vehicle 100 autonomously, i.e., actuating the propulsion system 125, the brake system 130, and the steering system 135 based on the pose of the object 200, e.g., to navigate around the object 200. After the block 545, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable to:

receive sensor data from a sensor indicating an object at a plurality of time steps, the sensor moving while generating the sensor data, the object being stationary;

receive motion data indicating motion of the sensor at the time steps;

determine a plurality of virtual pixel locations of the sensor at the time steps from a perspective of a virtual camera located at the object based on the sensor data and on the motion data, the virtual pixel locations being pixel locations of the sensor as would be seen in virtual image frames that would be generated by the virtual camera; and determine a pose of the object using the virtual pixel locations.

2. The computer of claim 1, wherein the instructions further include instructions to actuate a component based on the pose of the object.

3. The computer of claim 2, wherein the component is a component of a vehicle, the vehicle including the sensor.

4. The computer of claim 1, wherein the instructions to determine the pose of the object include instructions to solve a camera pose estimation algorithm for a pose of the virtual camera.

5. The computer of claim 4, wherein the camera pose estimation algorithm is a perspective-n-point algorithm.

6. The computer of claim 4, wherein the motion data includes a plurality of rotations of the sensor between consecutive ones of the time steps, and the instructions to determine the pose of the object include instructions to determine the pose of the object based on the pose of the virtual camera and on the rotations.

7. The computer of claim 1, wherein the instructions further include instructions to determine a plurality of virtual positions of the sensor at the time steps from the perspective of the virtual camera, and the instructions to determine the pose include instructions to determine the pose using the virtual positions.

8. The computer of claim 7, wherein the instructions to determine the virtual positions include instructions to determine the virtual positions based on the motion data.

9. The computer of claim 8, wherein the motion data includes a plurality of actual positions of the sensor at the time steps and a plurality of rotations of the sensor between consecutive ones of the time steps, and the instructions to determine the virtual positions include instructions to determine the virtual positions based on the actual positions and the rotations.

10. The computer of claim 9, wherein the virtual positions are products of respective cumulative rotations and the respective actual positions, each cumulative rotation being a product of the rotations from a first one of the time steps to a respective one of the time steps.

11. The computer of claim 1, wherein the sensor data includes a plurality of actual pixel locations of the object at the time steps, and the instructions to determine the virtual pixel locations include instructions to determine the virtual pixel locations based on the actual pixel locations.

12. The computer of claim 11, wherein the motion data includes a plurality of rotations of the sensor between consecutive ones of the time steps, and the instructions to determine the virtual pixel locations include instructions to determine the virtual pixel locations based on the rotations.

13. The computer of claim 12, wherein the virtual pixel locations are products of respective cumulative rotations and the respective actual pixel locations, each cumulative rotation being a product of the rotations from a first one of the time steps to a respective one of the time steps.

14. The computer of claim 13, wherein the virtual pixel locations are products of an intrinsic matrix of the sensor, the respective cumulative rotations, an inverse of the intrinsic matrix, and the respective actual pixel locations.

15. The computer of claim 11, wherein the instructions further include instructions to apply an undistortion operation on the actual pixel locations, and the instructions to determine the virtual pixel locations include instructions to apply a distortion operation to a result of the undistortion operation on the actual pixel locations.

16. The computer of claim 1, wherein the instructions to determine the virtual pixel locations include instructions to determine the virtual pixel locations based on an intrinsic matrix of the sensor.

17. The computer of claim 1, wherein the instructions further include instructions to determine that the object is stationary.

18. The computer of claim 1, wherein the pose of the object has three spatial dimensions and three rotational dimensions.

19. The computer of claim 1, wherein the sensor is a camera.

20. A method comprising:

receiving sensor data from a sensor indicating an object at a plurality of time steps, the sensor moving while generating the sensor data, the object being stationary;

receiving motion data indicating motion of the sensor at the time steps;

determining a plurality of virtual pixel locations of the sensor at the time steps from a perspective of a virtual camera located at the object based on the sensor data and on the motion data, the virtual pixel locations being pixel locations of the sensor as would be seen in virtual image frames that would be generated by the virtual camera; and determining a pose of the object using the virtual pixel locations.

* * * * *